Aug. 13, 1963  J. R. ZIMMERMAN, JR., ETAL  3,100,866
NUCLEAR MAGNETIC RESONANCE IN THIN FILMS
Filed July 27, 1959  3 Sheets-Sheet 1
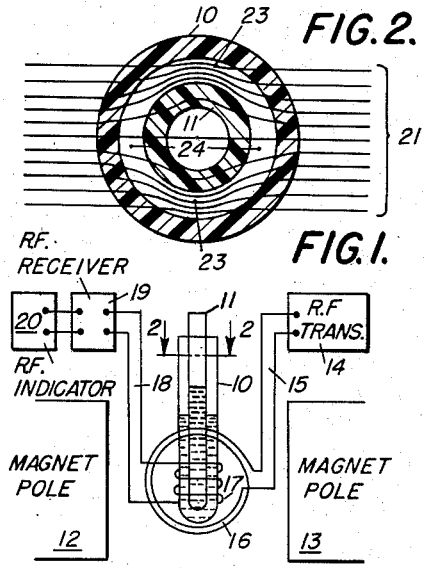
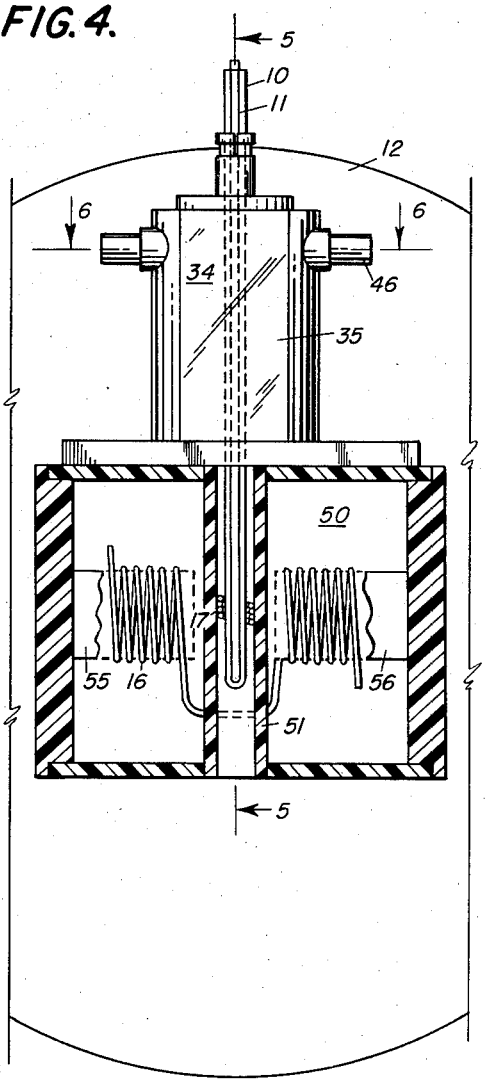
JOHN R. ZIMMERMAN, JR.
IRVING WEINBERG
INVENTORS.
BY D. Care Richards
ATTORNEY

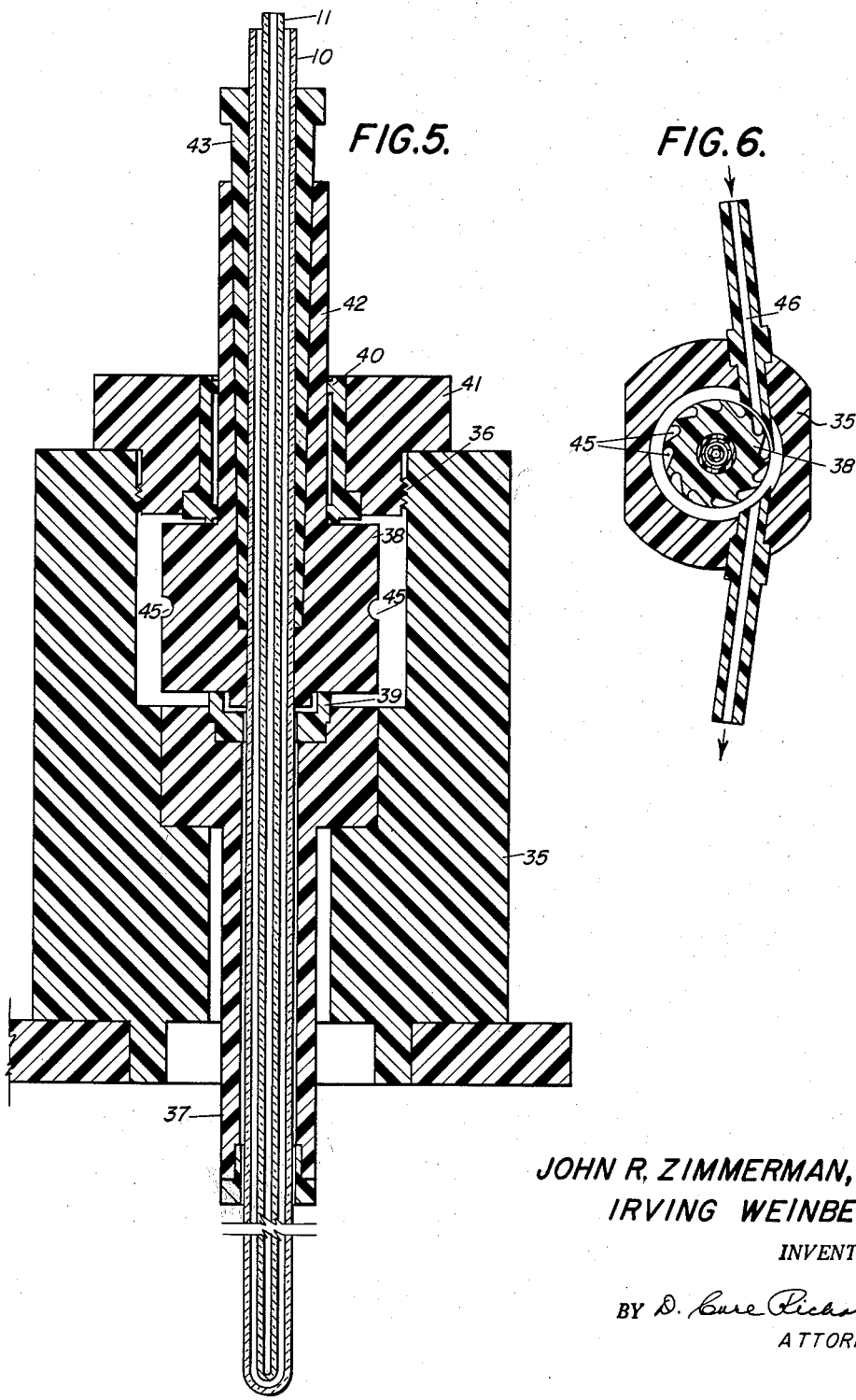

United States Patent Office 3,100,866
Patented Aug. 13, 1963

3,100,866
NUCLEAR MAGNETIC RESONANCE
IN THIN FILMS
John R. Zimmerman, Jr., Dallas, Tex., and Irving Weinberg, Woodbury, N.J., assignors to Socony Mobil Oil Company, Inc., a corporation of New York
Filed July 27, 1959, Ser. No. 829,927
7 Claims. (Cl. 324—.5)

This invention relates to nuclear measurements and more particularly to measurement of nuclear resonances in a polarizing magnetic field controllably distorted.

This application is a continuation-in-part of application Serial No. 488,070, filed February 14, 1955, now abandoned.

It has been discovered, as disclosed in Patent No. 2,561,489 to Bloch et al., that magnetic moments of nuclei in normal matter will result in a nuclear paramagnetic polarization upon the establishment of equilibrium in a constant magnetic field and that application of a radio frequency field at right angles to the constant field causes a forced precession of the total polarization relative to the direction of the constant field as the Larmor frequency approaches adiabatically the frequency of the radio frequency field. As a result, components of nuclear polarization appear at right angles to both the constant field and the radio frequency field and the resultant component is utilized to induce observable signals or voltages which are representative of variations in the resonance of the matter under test.

The present invention relates to measurements of the type above described in which substances under examination or measurement are disposed in the polarizing magnetic field in the form of thin walled cylinders or cylindrical films with the axes of the cylinders at right angles to the direction of the polarizing magnetic field. In another aspect of the invention the substances thus disposed in a magnetic field are rotated about the axes of symmetry thereof to produce a sharp resonance that may be employed as a standard or reference in a nuclear magnetic resonance spectrum. This type standard conveniently may be employed in connection with studies simultaneously obtained of the nuclear resonance characteristics of unknown substances with both the standard and the unknown substance as nearly as possible in the same magnetic environment.

In accordance with the present invention there is provided a method of measuring nuclear magnetic resonance of a substance of an uneven mass number which comprises orienting a quantity of the substance in a unidirectional magnetic field in the form of a shell having symmetry with respect to an axis normal to the direction of the magnetic field whereby the magnetic field is controllably distorted by the presence of the substance therein to produce a plurality of resonance states dependent upon the different magnetic field intensities throughout the substance. The magnetic resonances are then recorded. In accordance with another aspect, there is provided a method such as above described in which the sample is rotated to produce a sharp line spectrum from the plural resonances within the substance where the rotation is maintained relative to the axis of symmetry of the substance.

In accordance with another aspect of the invention there is provided a method and system for simultaneously measuring the magnetic resonance of an unknown substance and simultaneously providing a known reference point in the resonance spectrum by disposing a known substance in the form of the thin shell about the unknown substance and rotating both substances about an axis of symmetry of the shell.

For a further understanding of the present invention and for a more complete description thereof, reference may now be had to the following description taken in conjunction with the accompanying drawings in which:

FIG. 1 is a diagrammatic sketch of a high resolution nuclear magnetic resonance system;

FIG. 2 is an enlarged cross-sectional view of the sample holder of FIG. 1;

FIG. 3 illustrates resonances obtained with the system of FIGS. 1 and 2;

FIG. 4 is a sectional view of a portion of the system of FIG. 1;

FIG. 5 is a sectional view of FIG. 4 taken along line 5—5 thereof;

FIG. 6 is a sectional view of FIG. 4 taken along the line 6—6 thereof;

Figure 7:
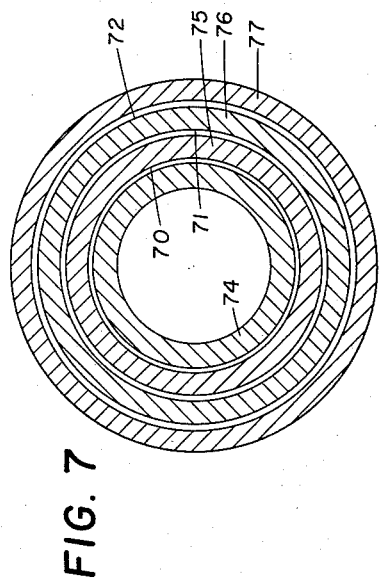
FIG. 7 illustrates a modification of the invention.

In FIG. 1 coaxially disposed glass tubes 10 and 11 are positioned in a uniform unidirectional magnetic field produced by a magnetic system represented by magnet poles 12 and 13. An R.F. transmitter 14 connected by channel 15 to a coil 16 is employed to apply to the material in test tubes 10 and/or 11 a radio frequency field oriented at right angles to the unidirectional field between poles 12 and 13. A detecting coil 17 is connected by way of channel 18 to an R.F. receiver 19 and thence to an R.F. receiver 20.

In high resolution nuclear magnetic resonance systems the radio frequency field established by coil 16 is maintained at a constant frequency and amplitude. The polarizing magnetic field in the gap between poles 12 and 13 is then slowly changed monotonically or from a first value to a second value to cover a range such that a substance placed in a test tube is subjected to a range of magnetic fields to drive the substance through a nuclear resonance. An electromagnetic field having a component perpendicular to both the polarizing magnetic field and the moving magnetic field from coil 16 induces a voltage in coil 17, which voltages is then displayed or otherwise measured or preserved on the R.F. indicator 20.

The present invention relates to a high resolution system in which a substance to be tested is disposed in the polarizing magnetic field in the form of a relatively thin film or cylinder. For example as shown in FIG. 1, the material in the annulus between tubes 10 and 11 is one form particularly desirable for use in the present invention. This configuration may best be seen where tubes 10 and 11 have been greatly enlarged and illustrated in the cross-sectional view of FIG. 2.

The polarizing magnetic field represented by flux lines 21, FIG. 2, is uniform outside tubes 10 and 11. However assuming that the material in the annulus between tubes 10 and 11 has a higher magnetic susceptibility than the glass itself, a distortion of the magnetic field is produced. As shown, there is a concentration of flux lines in regions 23 because of the lower magnetic reluctance in the flux path in the direction of the magnetic field afforded by portions of the annulus. Conversely in regions 24 there is a "rarefaction" of the magnetic field. Thus the material in the annulus in regions 23 is in a much higher magnetic field than in regions 24. Nuclei in the region 23 of the thin cylindrical shell, when subjected to an R.F. field as from transmitter 14, channel 15 and coil 16, FIG. 1, will resonate at a higher frequency than those in regions 24 because of the different magnetic fields in the immediate vicinity of the nuclei.

To illustrate this effect there is plotted in FIG. 3, graph A, a high resolution spectrum obtained in a system of FIG. 1 modified by removing the inner test tube 11 and filling the entire volume of test tube 10 with water. The amplitude of the voltage induced in coil 17 is plotted along the ordinate and magnetic field strength is plotted along the abscissa. The bulk resonance for water is characterized by a curve 30 which has a single predominant peak. If the system is altered by inserting tube 11 into tube 10 thereby displacing a major portion of the water and forcing the water remaining to form a thin cylindrical shell, the resonance phenomenon is represented by the curve 31. This curve is characterized by two peaks 32 and 33 displaced on opposite sides of peak 30. Peaks 32 and 33 may be taken as representative of proton resonance in the highest magnetic field as in zone 23, FIG. 2, and the resonance in the lowest magnetic field such as in regions 24, FIG. 2, respectively. Transitions between the high and low magnetic fields are represented by the region between peaks 32 and 33.

It has further been found that materials in the annulus between tubes 10 and 11 having different susceptibilities cause differences in the spacing between peaks 32 and 33. Such differences are readily interpretable in terms of the magnetic susceptibility of the material in the annulus. Thus there is provided a method of measuring directly the magnetic susceptibility of substances.

It has further been found that if a known substance is placed in the annulus and from which there may be produced a resonance of the type shown on curve 31, FIG. 3, further steps may be followed to produce a single resonance peak extremely sharp in character which may then be employed as a standard or calibrating point in the resonance spectrum for unknown samples. This is particularly advantageous because the reference material and an unknown sample will be positioned as nearly as is possible in a common magnetic environment. The unique geometry of the system permits such orientation of the materials to be tested and also the simultaneous production of a calibration curve from a known substance and a resonance curve from an unknown substance. A known sample placed in the annulus and an unknown inside tube 11, rotated together at high speeds about the longitudinal axis of the tubes 10 and 11, produce desired observable resonance signals.

Such a system is illustrated in FIG. 4, slightly enlarged in FIG. 5, and also shown in FIG. 6 where, for convenience, like parts will be given the same reference characters. Tubes 10 and 11 are mounted in an air turbine 34, FIG. 4, preferably formed entirely of non-magnetic plastic material. The turbine includes a cylindrical housing 35 having a threaded upper portion 36 on the interior of a doubly re-entrant opening or well which extends therethrough. A bearing support and guide member 37 is seated inside housing 35 and extends below housing 35. A central channel through the member 37 accommodates tubes 10 and 11. A rotor 38 is supported on a relatively small cylinder 39 supported by member 37 and also is provided with a bearing insert 40 which is carried by a cap 41 and which threadedly engages housing 35. The rotor 38 is provided with an elongated extension 42, the upper end of which is fitted with a collet type chuck which includes a split truncated cone 43 having a cylindrical opening therethrough which is adapted to receive tube 10. The insert 43 when forced into the extension 42 firmly grips the outer surface of test tube 10.

Rotor 38 is provided with a series of air scoops 45 on the periphery thereof and positioned in alignment with an air inlet tube 46, FIG. 6. Incoming air entering the inlet tube 46 produces rotation of rotor 38 which carries with it tubes 10 and 11. As shown in FIG. 4, the air turbine 35 is mounted with test tubes 10 and 11 extending down into the test unit 50. Test unit 50 includes a well formed of a cylinder 51 in which test tubes 10 and 11 are centered. The detecting coil 17 is secured to the inner surface of cylinder 51 and is located substantially symmetrical to the axis of the R.F. field coil 16. Coil 16 is split as shown in FIG. 4 and mounted on suitable non-magnetic cylindrical extensions 55 and 56 which are secured to the ends of the test unit 50. The axes of coils 16 and 17 are mutually perpendicular to each other and to the polarizing magnetic field which extends between the magnetic poles 12 and 13, only magnetic pole 12 being shown (in part) in FIG. 4.

The operation of the system may best be understood by now considering FIG. 3. Curve 31 of graph A is representative of the nuclear resonance spectrum of water in the annulus between tubes 10 and 11 without rotation. Graphs B, C, D, E and F represent transitions in curve 31 as a function of the rotational speed of the tubes 10 and 11. The shifted broadened resonance of curve 31 is fairly symmetrical with respect to the bulk water resonance of curve 30, graph A. However, the separation of peaks 33 and 32 relative to the peak of curve 30 may readily be measured as the distance along the magnetic field scale H. With increasing speeds of revolution of the tubes 10 and 11 with water in the annulus only, the effects shown in graphs B–F are observed which readily show an apparent breaking up of the pattern of graph A. This effect is apparent in graph B. As speed further increases, a pattern appears with fairly predominant peaks 60 and 61, graph C, which are symmetrical with respect to a line 63 which is equally spaced from peaks 32 and 33. Secondary peaks 64 and 65 may also be seen. Thus the peaks 32 and 33 each break up into separate resonances. However as speed further is increased, the resonances shown in graph C break up to emphasize a single resonance peak 66 symmetrical to line 63. As shown in graph D, peak 66 becomes pronounced with decreased amplitude on the flanks thereof. Graph E shows the peak 66 fairly well developed and graph F shows a final development of a sharp spike, which may be considered to be a Bessel function distribution of the resonance of nuclei in the annulus between test tubes 10 and 11.

By producing the sharp line resonance, an accurate index is thus provided for use in connection with unknown substances placed inside the inner tube 11.

Thus not only is there provided a means using thin cylindrical films for measuring magnetic susceptibility of unknown samples but also the method and apparatus for providing an accurate sharp reference point in a resonance spectrum for studies of other unknown.

The foregoing is accomplished by first distorting the magnetic field in a controlled manner through the use of a sample of given geometrical configuration. While the sample under test in the drawings is cylindrical in form, other configurations may be employed. For example, glass mandrels may be employed in place of the inner tube 11 which have shapes other than the cylindrical form which will controllably distort the magnetic field and modify the actual shape of the resonance produced. In any event the magnetic field is controllably distorted to produce a plurality of resonances.

While the foregoing description is related to the use of test tubes 10 and 11, it is to be understood that in practice such tubes are relatively small in diameter. In one embodiment, tube 10 was a glass capillary having a 5 millimeter outside diameter and the inner tube 11 was a glass capillary having a 3 millimeter outside diameter. The space between the capillaries then accommodated but a relatively thin film of water. The film of water was then placed in a polarized magnetic field in the order of 9500 gauss. A radio frequency field was produced normal to the polarizing field having a frequency of the order of $40 \times 10^6$ cycles per second and of low intensity compared with the polarizing field in the order of a milligauss. By slowly varying the polarizing magnetic field over a range of about 20 to 40 milligauss there were detected the twin peaks 32 and 33, FIG. 3, which, depending upon the dimensions of the film, were 12 to 30 milligauss apart. After obtaining the curve 31, FIG. 3, the system was rotated up to a speed of about 80 cycles per second to achieve the relatively sharp peak 66 of graph F, FIG. 3.

While the foregoing measurements were employed using water in the annulus between capillaries, it will be readily apparent that other proton bearing compounds may be employed to secure similar resonance curves thereof. Further, the use of solids may find ready application to the present invention, such solids being placed in the polarizing fields in the form of thin cylindrical shells or other configurations which will distort the magnetic field in a controlled manner.

It will be readily appreciated that the changes in the geometry of the system may serve to produce changes in the resonance signals. Uniformity of results in connection with tests and calibration procedures will depend to a degree upon the symmetry of the system relative to the axis of rotation. This might suggest the necessity of precision elements for tubes 10 and 11. However, it has been found that stock tubes often may be employed if they are first subjected to a preliminary evaluation. One method of evaluating the symmetry of a system is to place a first substance in the annulus between tubes 10 and 11 and a second substance inside tube 11. The tubes are then placed in the air turbine and rotated to produce two resonance signals, one of the character of graph F, FIG. 3, and the other the resonance of the material inside tube 11. The tubes may then be cleaned and the same substances replaced but with positions reversed so that the first material is now in tube 11 and the second material forming the annular film. Rotation of the system again will produce the two resonance curves. If the system embodies the required degree of symmetry, the spacing between the two resonance curves in terms of polarizing magnetic field intensity will be identical for both tests and the tubes are satisfactory. Asymmetry will cause deviation in the spacings between the resonance curves, indicating that the tubes may be unsatisfactory.

The foregoing description pertains to the use of a system in which the radio frequency signal is maintained constant and the polarizing magnetic field is varied over a range defining a spectral scale. It will be apparent that the polarizing magnetic field may be maintained constant and the alternating field varied in frequency to define a spectral scale. Although the turbine of FIGS. 4–6 has been described as an air turbine, it will be readily apparent that other fluids may be employed so long as they do not materially alter the magnetic field or exhibit a nuclear resonance phenomenon which will interfere with the measurements being made.

When it is desirable to establish more than one reference point in a nuclear magnetic spectrum, a plurality of cylindrical films may be employed, each film being formed of a different substance so that reference lines will be present at different points in the spectrum and will preferably straddle the data produced by the unknown. In FIG. 7, for example, there is illustrated a multicylinder indexing system in which three annular zones 70, 71, and 72 are formed for receiving standard solutions to provide a scale indication with respect to an unknown substance placed within the inner receptacle. In this system, an inner tube 74 is adapted to receive the unknown in the center thereof. Three tubes of successively larger diameter 75, 76, and 77 are employed to form the annular sample receiving zones. Thus, there may be provided a plurality of indicia for measurements and for establishing a suitable scale for nuclear magnetic resonance measurements.

Figure 8:
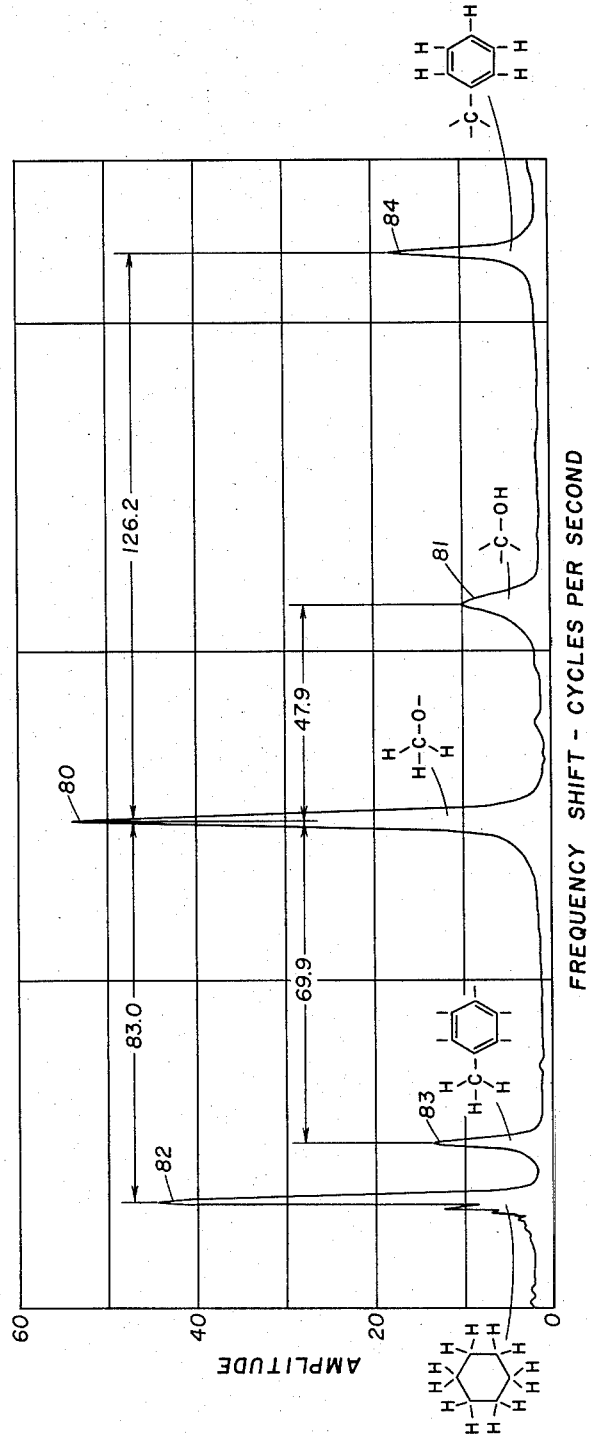
FIG. 8 is a plot of test results from a multi-standard system.

In FIG. 8, there is illustrated the results of a measurement wherein scale was provided for the NMR test by using two annular films and one unknown. In this system, three tubes were employed, the inner one adapted to receive the unknown sample. The two annular zones respectively contained, in the first film, cyclohexane; and in the second film, toluene. The unknown in this case was identified as methyl alcohol. The first peak 80 is a resonance produced by the unknown and specifically by the methoxy group. The second peak 81 which is spaced upward along the frequency scale 47.9 cycles per second is a resonance produced by the unknown and more specifically by the hydrogen in the hydroxyl group. The first film, cyclohexane, provided the resonance for peak 82. Toluene, in the second film, provided resonances represented by the peaks 83 and 84. The peak 83 represents resonance of the methyl group. The peak 84 represents resonance of the hydrogen atoms in the benzene ring. The foregoing measurements were made at Larmor frequencies of the order of 40 megacycles.

From the foregoing, it will be seen that a plurality of thin films may be employed for referencing a nuclear magnetic resonance system to bracket the data representative of an unknown and thereby provide a more definite measure of the resonances involved in the unknown and to assist in the identification thereof.

Having described the invention in connection with certain modifications thereof, it will be understood that further modifications may now suggest themselves to those skilled in the art and it is intended to cover such modifications as fall within the scope of the appended claims.

What is claimed is:

1. A nuclear magnetic resonance system comprising means for establishing a substantially uniform polarizing magnetic field, inner and outer capillaries supported in said magnetic field with the axes thereof perpendicular to the direction of said magnetic field and adapted to receive test materials in a first zone inside the inner capillary and in zones formed by the annulus between said inner and outer capillaries, means for applying a moving magnetic field perpendicular to said polarizing magnetic field in the region of said capillaries, and means for detecting signals produced in at least one of said zones formed by said annulus.

2. A nuclear magnetic resonance system comprising means for establishing a substantially uniform polarizing magnetic field, a pair of coaxially disposed capillaries supported in said magnetic field with the axes thereof perpendicular to the direction of said magnetic field and adapted to receive test materials in a first zone inside the inner capillary and in a second zone formed by the annulus between said capillaries, means for applying a moving magnetic field perpendicular to said polarizing magnetic field in the region of said capillaries, and means for detecting signals produced in both said zones.

3. The combination with a high resolution nuclear magnetic resonance system which comprises a means for supporting a known sample and an unknown sample in the magnetic field of said system in the form of cylindrical coaxially disposed bodies with said known sample forming an outer shell around said unknown sample whereby the magnetic field occupied by said known sample is of nonuniform character because of the cylindrical configuration of said samples, means for rotating said samples about the common axis thereof to produce a discrete set of multiple resonance signals from said known sample and to produce distinctive resonance signals from said unknown sample, and means for recording the combined resonances from said samples.

4. A nuclear magnetic resonance system comprising means for establishing a substantially uniform polarizing magnetic field, a pair of coaxially disposed capillaries supported in said magnetic field with the axes thereof perpendicular to the direction of said magnetic field and adapted to receive test materials in a first zone inside the inner capillary and in a second zone formed by the annulus between said capillaries, means for applying a moving magnetic field perpendicular to said polarizing magnetic field in the region of said capillaries, means for rotating said capillaries about the axes thereof to modify signals produced by nuclei in said second zone, and means for detecting signals produced in both said zones.

5. The combination with a high resolution nuclear magnetic resonance system which comprises a pair of sample receptacles one disposed inside the other and both positioned to extend at least in part into a zone of substantially uniform polarizing magnetic field in said resonance system, a turbine of non-magnetic materials adapted to support said receptacles for rotation about the longitudinal axis thereof, fluid means for diriving said turbine to rotate said receptacles about said longitudinal axis, and means for registering nuclearly induced signals from substances in said receptacles as a function of the speed of rotation thereof.

6. The method of comparing nuclear properties of two materials in which nuclei in samples thereof are polarized by a unidirectional magnetic field which comprises monotonically varying the magnitude of said unidirectional field, applying a moving magnetic field perpendicular to said unidirectional magnetic field to upset the predominant orientation of said nuclei to produce distinctive physical conditions representative of nuclear resonances in both said materials, cyclically varying the position in said magnetic field of at least one of said samples to vary the intensity of said unidirectional magnetic field in said one of said materials to produce a Bessel function distribution of components of the physical condition representative of resonance in said one of said materials, and recording said conditions.

7. The method of comparing nuclear properties of two materials in which the nuclei in samples thereof are polarized by a unidirectional magnetic field which comprises slowly and monotonically varying the magnitude of said unidirectional magnetic field, simultaneously applying a moving magnetic field perpendicular to said unidirectional magnetic field to upset the predominant orientation of said nuclei to produce distinctive physical conditions representative of a nuclear resonance in each of said materials, cyclically varying the position of a first of said samples in a zone immediately adjacent the second of said samples to produce a Bessel function distribution of components of said physical condition in said first of said samples, and recording said conditions in both said samples as a function of the variations in magnitude of said unidirectional field.

References Cited in the file of this patent

UNITED STATES PATENTS

| | | |
|---|---|---|
| 2,878,444 | Feher | Mar. 17, 1959 |
| 2,960,649 | Bloch | Nov. 15, 1960 |

FOREIGN PATENTS

| | | |
|---|---|---|
| 150,333 | Australia | Feb. 27, 1953 |
| 1,126,251 | France | July 23, 1956 |

OTHER REFERENCES

Norberg: Physical Review, vol. 86, No. 5, June 1, 1952, pp. 745 to 752 incl.

H. Anderson: Physical Review, vol. 71, No. 10, Nov. 15, 1949, pp. 1460 to 1470 incl.

Reilly et al.: Bulletin of the American Physical Society, vol. 29, No. 8, Dec. 8, 1954, pp. 16–18, paragraph I4, received Dec. 8, 1954, by the National Bureau of Standard Library.

Anderson et al.: Physical Review, vol. 94, No. 2, Apr. 15, 1954, pp. 496 to 498.

Williams et al.: Physical Review, vol. 104, No. 2, Oct. 15, 1956, pp. 278 to 283.

Shoolery et al.: Review of Scientific Instruments, vol. 28, No. 1, January 1957, pp. 61 and 62.

Morin et al.: Journal of Physical Chemistry, vol. 60, Nov. 11, 1956, pp. 1594 to 1596.

Reilly et al.: Physical Review, vol. 98, No. 1, April 1955, pp. 264 to 266.